US 8,284,330 B2

(12) United States Patent
Lee et al.

(10) Patent No.: US 8,284,330 B2
(45) Date of Patent: *Oct. 9, 2012

(54) DISPLAY APPARATUS HAVING LIGHT-SHIELDING LAYER AND VARIABLE LIGHT-TRANSMITTANCE PATTERN (75) Inventors: Moung-Youb Lee, Pyeongtaek-si (KR); Yun-Joo Kim, Pyeongtaek-si (KR); Jong-Hyun Byeon, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 156 days.

This patent is subject to a terminal disclaimer.

(21) Appl. No.: 12/575,239

(22) Filed: Oct. 7, 2009

(65) Prior Publication Data
US 2010/0259827 A1  Oct. 14, 2010

(30) Foreign Application Priority Data
Apr. 9, 2009 (KR) .................. 10-2009-0030911

(51) Int. Cl.
*H04N 5/64* (2006.01)
*G02F 1/01* (2006.01)

(52) U.S. Cl. ............... 348/842; 348/58; 359/609
(58) Field of Classification Search .......... 348/842; 349/58; 359/609; 361/807
See application file for complete search history.

(56) References Cited

U.S. PATENT DOCUMENTS

| 5,061,052 A | 10/1991 | DeJesus |
| 5,400,177 A | 3/1995 | Petitto et al. |
| 5,739,880 A * | 4/1998 | Suzuki et al. ............ 349/110 |
| 5,828,410 A | 10/1998 | Drapeau |
| 6,313,946 B1 | 11/2001 | Petitto et al. |
| 6,919,678 B2 * | 7/2005 | Ozolins et al. ............ 313/479 |
| 7,222,969 B2 | 5/2007 | Veligdan |
| 7,223,009 B2 | 5/2007 | Henriet et al. |
| 7,298,076 B2 | 11/2007 | Ozolins et al. |
| 7,551,372 B2 | 6/2009 | Xun et al. |
| 7,567,380 B2 | 7/2009 | Peterson et al. |
| 7,719,745 B2 * | 5/2010 | Yamada ............ 359/245 |
| 2002/0118339 A1 | 8/2002 | Lowe |
| 2006/0158579 A1 * | 7/2006 | Hasegawa ............ 349/58 |
| 2006/0198033 A1 | 9/2006 | Soyama et al. |
| 2007/0103854 A1 * | 5/2007 | Yu et al. ............ 361/681 |
| 2007/0291203 A1 * | 12/2007 | Nakahara et al. .......... 349/113 |
| 2009/0109366 A1 * | 4/2009 | Lippey ............ 349/58 |
| 2009/0231524 A1 * | 9/2009 | Tanaka ............ 349/110 |
| 2009/0322982 A1 * | 12/2009 | Finnegan ............ 349/58 |
| 2010/0097447 A1 * | 4/2010 | Tomisawa et al. .......... 348/51 |

(Continued)

FOREIGN PATENT DOCUMENTS
JP  2000-295483  10/2000

(Continued)

OTHER PUBLICATIONS

Office Action issued in U.S. Appl. No. 12/630,038 dated Feb. 3, 2011.

(Continued)

*Primary Examiner* — Mark Consilvio
(74) *Attorney, Agent, or Firm* — KED & Associates LLP (57) ABSTRACT

A display apparatus comprising a display module, a front panel provided in front of the display module, a light shielding layer provided over the front panel near a periphery of the front panel, and a reflective layer formed to overlap with the light shielding layer.

20 Claims, 12 Drawing Sheets

U.S. PATENT DOCUMENTS

| | | | |
|---|---|---|---|
| 2010/0232026 A1 | 9/2010 | Park et al. | |
| 2010/0232027 A1 | 9/2010 | Park et al. | |
| 2010/0246104 A1 | 9/2010 | Park et al. | |
| 2010/0259827 A1* | 10/2010 | Lee et al. | 359/609 |
| 2010/0259828 A1* | 10/2010 | Byeon et al. | 359/609 |
| 2010/0259829 A1* | 10/2010 | Kim et al. | 359/609 |
| 2010/0315570 A1* | 12/2010 | Mathew et al. | 349/58 |
| 2011/0007398 A1* | 1/2011 | Lim et al. | 359/614 |
| 2011/0013346 A1* | 1/2011 | Ju et al. | 361/679.01 |

FOREIGN PATENT DOCUMENTS

| | | | |
|---|---|---|---|
| JP | 2003-215304 | | 7/2003 |
| JP | 2004029220 A | * | 1/2004 |
| JP | 2005-166811 | | 6/2005 |
| JP | 2005-242265 | | 9/2005 |
| JP | 2005-257794 | | 9/2005 |
| JP | 2005-354474 | | 12/2005 |
| JP | 2006047271 A | * | 2/2006 |
| JP | 2006-073545 | | 3/2006 |
| JP | 2006-128421 | | 5/2006 |
| JP | 2006-179683 | | 7/2006 |
| JP | 2008209764 A | * | 9/2008 |
| JP | 2011123406 A | * | 6/2011 |
| KR | 10-0817560 | | 3/2008 |
| KR | 10-0841318 | | 6/2008 |
| KR | 10-2008-0106604 | | 12/2008 |
| WO | WO 02/27399 | | 4/2002 |
| WO | WO 2010055565 A1 | * | 5/2010 |

OTHER PUBLICATIONS

Office Action issued in U.S. Appl. No. 12/630,026 dated Mar. 21, 2011.
Office Action issued in U.S. Appl. No. 12/630,009 dated Apr. 5, 2011.
International Search Report dated Mar. 22, 2010.
International Search Report dated May 26, 2010.
Notice of Allowance issued in U.S. Appl. No. 12/630,009 dated May 16, 2011.
U.S. Office Action issued in U.S. Appl. No. 12/575,313 dated Dec. 27, 2011.

* cited by examiner

DISPLAY APPARATUS HAVING LIGHT-SHIELDING LAYER AND VARIABLE LIGHT-TRANSMITTANCE PATTERN

CROSS-REFERENCE TO RELATED APPLICATIONS

The present application claims priority under 35 U.S.C. 119 and 35 U.S.C. 365 to Korean Patent Application No. 10-2009-0030911 (filed on 9 Apr. 2009), which is hereby incorporated by reference in its entirety.

BACKGROUND

1. Field

One or more embodiments described herein relate to a display apparatus.

2. Background

Various electronic devices such as mobile communication terminals, digital cameras, notebook computers, monitors and televisions (TV) include one or more display apparatuses. These apparatuses include Liquid Crystal Display Devices (LCDs), Plasma Display Panels (PDPs), Electro Luminescent Displays (ELDs) and Vacuum Fluorescent Displays (VFDs). Many of these devices have drawbacks that require attention.

BRIEF DESCRIPTION OF THE DRAWINGS

FIGS. 21(a)-(e) are diagrams showing cross-sectional views that result from steps performed according to one embodiment of a method for manufacturing a display apparatus.

DETAILED DESCRIPTION OF THE EMBODIMENTS

Figure 1:
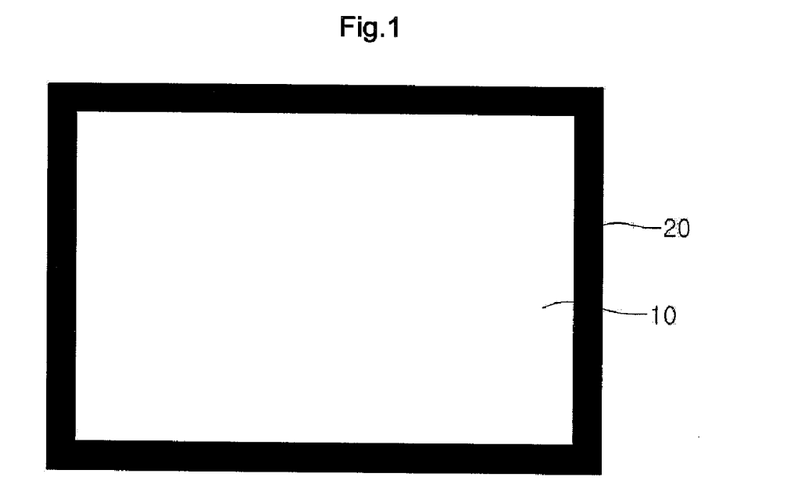
FIG. 1 is a diagram showing display and non-display regions of a display apparatus.

FIG. 1 shows display and non-display regions of a display apparatus, as viewed from a front surface that corresponds, for example, to a shape as seen by a user. The display region 10 shows images to be displayed and non-display region 20 corresponds to a region in which images are not displayed. The non-display region is formed at an outer region of the display apparatus and is disposed to surround the display region.

A light shielding layer may be formed at the non-display region. This layer can shield light that passes through or emanates from an outer region of the display apparatus. Accordingly, only images to be displayed are visible to a user and structures which are disposed at the outer region of the display apparatus are invisible to the user. Also, the light shielding layer may be black in color for effectively shielding light. For example, the light shielding layer may be a black layer which is printed in black. When seen by a user, the non-display region of the display apparatus may therefore be perceived as black.

When the display apparatus is powered off, display region 10 in which an image is not currently displayed has a black appearance similar to the color of the non-display region. However, the reflection, absorption and/or diffusion of external light may be different in the display and non-display regions.

For example, a portion of external light may be reflected at display region 10 by an internal display panel, and most of the external light may be absorbed at non-display region 20 where a black layer is printed. Accordingly, when the display apparatus is powered off, the visual difference between the display and non-display regions may occur. The visual difference may particularly be apparent at a boundary between the display and non-display regions, and thus the design characteristic of the display apparatus can be degraded.

FIGS. 2 to 10 are cross-sectional views showing various arrangements of a first embodiment of a display apparatus. This apparatus include a display module 100, a front panel 110, a light shielding layer 120, and a reflective layer 200.

Figure 2:
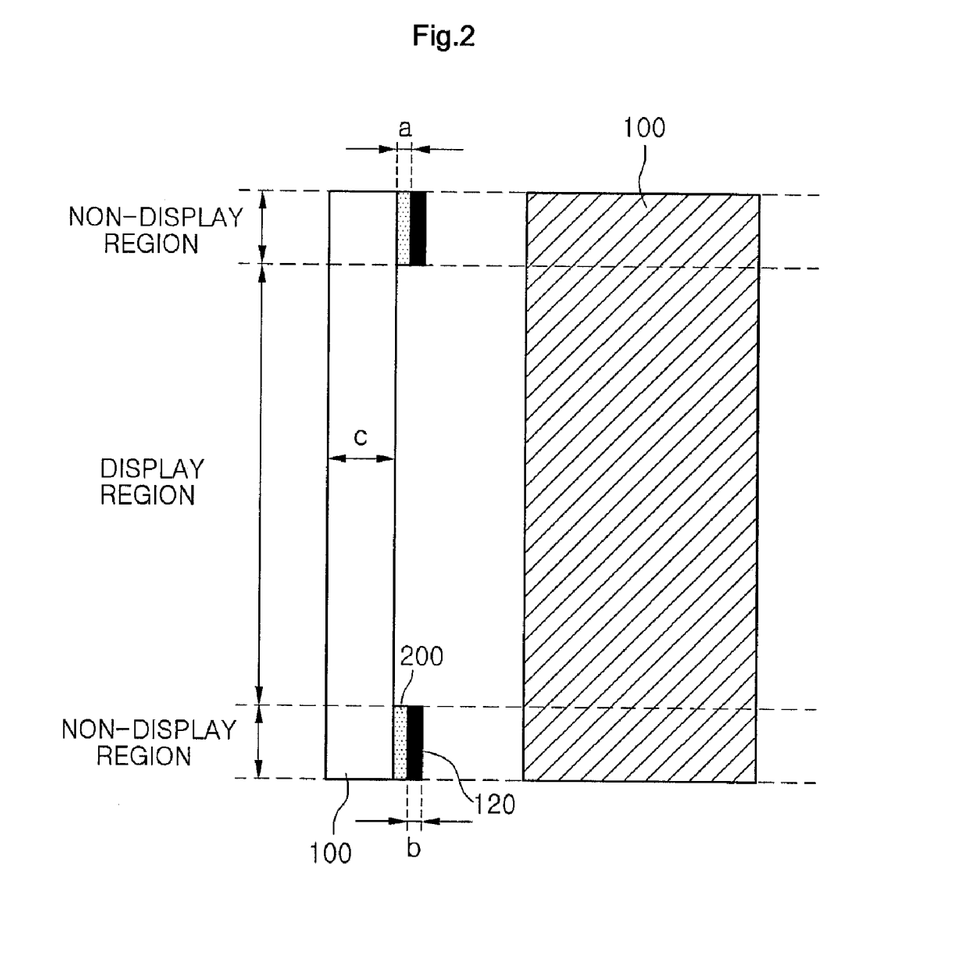
FIGS. 2 to 10 are diagrams showing cross-sectional views of a first embodiment of a display apparatus.

Referring to FIG. 2, display module 100 radiates light in a front direction where front panel 110 is located to thereby display images. The display module may, for example, be a liquid crystal display module which includes a liquid crystal panel (not shown) and a backlight unit (not shown). The liquid crystal panel displays pictures using light provided from the backlight unit. As such, the liquid crystal panel may include a liquid crystal layer and a thin film transistor (TFT) substrate and color filter substrate which face each other relative to the liquid crystal layer. The backlight unit may provide light using a light emitting diode (LED).

The display apparatus may alternatively be any one of a number of other display apparatuses including but not limited to an Electro Luminescent Displays (ELD), Vacuum Fluorescent Display (VFD), OLED, LED, PDP, and so on.

The front panel 110 is disposed in front of display module 100 at a certain distance and serves to protect the display module from external impact. Moreover, by transmitting light radiated from the display module, the front panel allows an image (displayed at display module 100) to be visible from an outside vantage point. The front panel may, for example, be formed of a plastic or glass material such as acrylic having impact resistance and light permeability.

The light shielding layer 120 may be formed at the non-display region, e.g., over the front panel near a periphery of front panel 110.

The reflective layer 200 may be formed on a surface of front panel 110 in an overlapping relationship with light shielding layer 120. That is, light shielding layer 120 and reflective layer 200 may be formed to overlap each other at the non-display region of front panel 110. The reflective layer 200 may be formed by depositing a metal (e.g., nickel (Ni) or aluminum (Al)) on one surface of the front panel. According to one embodiment, reflective layer 200 may be a metal thin-film layer formed by deposition.

Also, the reflective layer may be light-reflexible and light-transmittable. That is, the reflective layer (e.g., the metal thin-film layer) may be light-reflexible and light-transmittable based on its metal characteristics and thin-film characteristics. Consequently, the reflective layer may reflect a portion of external light and transmits a portion of external light.

Moreover, light shielding layer 120 may be disposed between reflective layer 200 and display module 100. More specifically, as shown in FIG. 2, the reflective layer may be formed at a first surface, which is more adjacent to the display module, among the surfaces of the front panel and light shielding layer 120 may be stacked and formed on the reflective layer 200. The light shielding layer 120 may be a black layer that is printed in black. For example, by forming a black print layer on reflective layer 200 which is formed at the first surface of the front panel 110, the light shielding layer 120 may be formed.

As described above, reflective layer 200 may be light-reflexible and light-transmittable, and thus a portion of external light incident on the non-display region is reflected by the reflective layer and is again radiated to the front of the display apparatus, i.e., towards a viewer, and another portion of external light incident on the non-display region is transmitted through the reflective layer and absorbed into light shielding layer 120, which, for example, may be a printed black layer.

According to the above-described configuration, reflection of the external light that occurs in the display region may occur in the non-display region and more specifically in reflective layer 200 formed at the non-display region. Also, or alternatively, absorption of external light in the display region may also occur in the non-display region, and thus both the display region and the non-display region may have a black appearance.

Consequently, when the display apparatus is seen by a viewer from a front position, similar visual reflection sensitivity may be perceived in the display and non-display regions. Accordingly, a visual difference between the display and non-display regions may be decreased.

In one embodiment, the thickness 'a' of reflective layer 200 may be thinner than the thickness 'b' of the light shielding layer 120 and the thickness 'c' of the front panel 110. As thickness 'a' increases, the reflection rate of the reflective layer may increase and the transmission rate of reflective layer 200 decreases. As a result, the non-display region may be seem very bright. Conversely, as thickness 'a' of the reflective layer decreases, the transmission rate of the reflective layer increases and the reflection rate of reflective layer 200 may excessively decrease.

For a reflective layer 200 that is light-reflexible and light-transmittable and a non-display region that has black and reflection sensitivity sensed from the non-display region when seen by a user, the thickness 'a' of the reflective layer may be about 0.005 to about 0.1 µm and the transmission rate of the reflective layer may be about 30 to about 50%.

Moreover, the thickness 'b' of light shielding layer 120 may be about 0.5 to about 5 µm, and the thickness 'c' of the front panel 110 may be about 1 to about 8 mm.

The thickness 'a' of reflective layer 200, material, and color of the light shielding layer 120 may be selected to achieve a certain brightness of the printed black layer based on the configuration of display module 100 or front panel 110 and based on the distance between the display module and the front panel. That is, thickness 'a' of reflective layer 200, material, and the color of light shielding layer 120 may be determined so that the colors and reflection sensitivity of the display region and non-display region of the display apparatus can be identically sensed when seen by a viewer and more specifically their reflection rates can be identical or at least substantially so.

According to the above-described structure, reflective layer 200 and light shielding layer 120 are formed at the non-display region of the display apparatus to overlap. As a result, light differences between the display and non-display regions decrease, which lead to reduction or elimination of a perception of a boundary between these regions to a viewer. The front surface of the display apparatus which includes the display region and the non-display region may therefore appear as a single layer to the viewer.

In FIG. 2, the reflective layer and light shielding layer shown as having the same width and completely overlapping each other. However, in alternative embodiments, a portion of the reflective layer may not overlap the light shielding layer 120 or a portion of the light shielding layer may not overlap the reflective layer 200.

Figure 3:
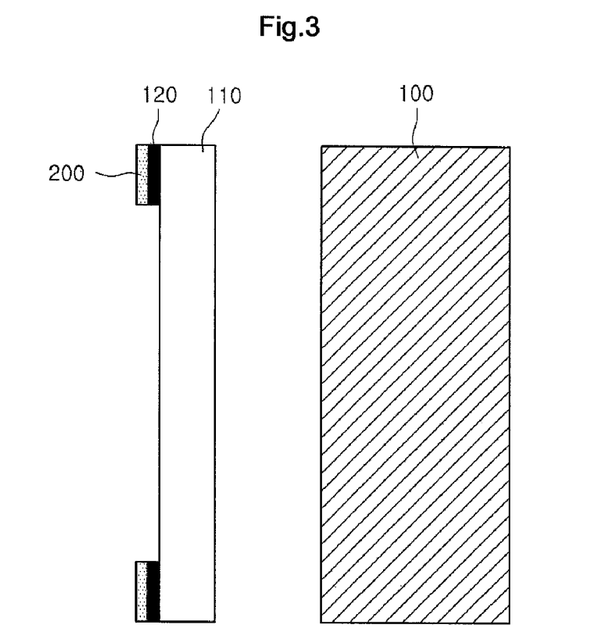

Referring FIG. 3, according to another arrangement, light shielding layer 120 may be formed at a second surface, which is farther away from display module 100, among the surfaces of front panel 110. Also, reflective layer 200 may be stacked and formed on the light shielding layer 120 in this arrangement. For example, the light shielding layer may be formed by printing a black layer at the second surface of the front panel, and reflective layer 200 may be formed on the light shielding layer, i.e., the printed black layer.

Figure 4:
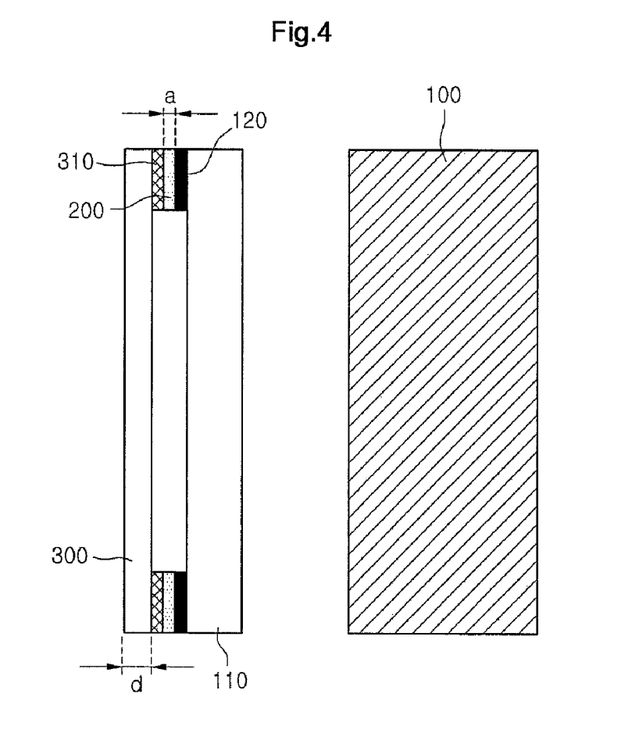

Referring to FIG. 4, the display apparatus according to an embodiment may further include a transparent film 300 which is disposed in front of the front panel 110, wherein transparent film 300 may be formed of PolyEthylen Terephthalate (PET). Moreover, the transparent film 300 may include one or more function layers for enhancing the light characteristic of a displayed image.

As shown in FIG. 4, a transparent film 300 may be adhered to front panel 110 on which light shielding layer 120 and reflective layer 200 are formed. In this case, an adhesive layer 310 may be formed between the transparent film and front panel, and more specifically between the transparent film and reflective layer 200.

The thickness 'd' of transparent film 300 may be about 0.05 to 0.4 mm, and may be thicker than the thickness 'a' of reflective layer 200. A hard coating layer (not shown) may be formed at the front surface of the transparent film and thus can protect the transparent film from external impact.

Figure 5:
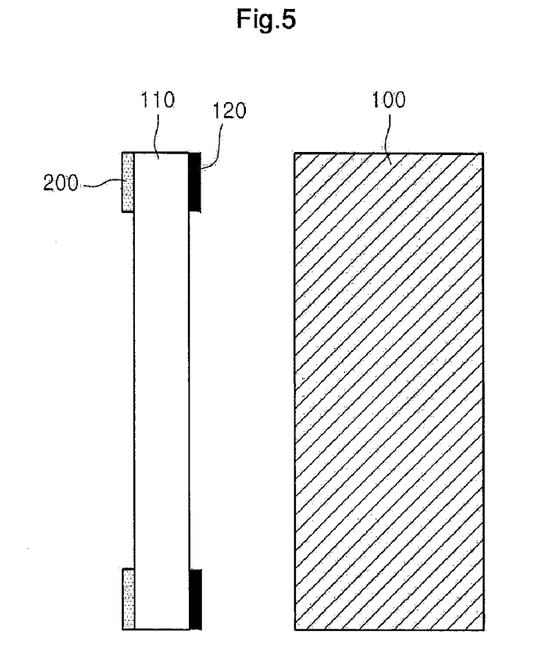

In another arrangement, light shielding layer 120 and reflective layer 200 may be formed at respective surfaces of front panel 110, as shown in FIG. 5. For example, the light shielding layer may be formed at a first surface of the front panel and the reflective layer may be formed at a second surface of the front panel as shown.

Figure 6:
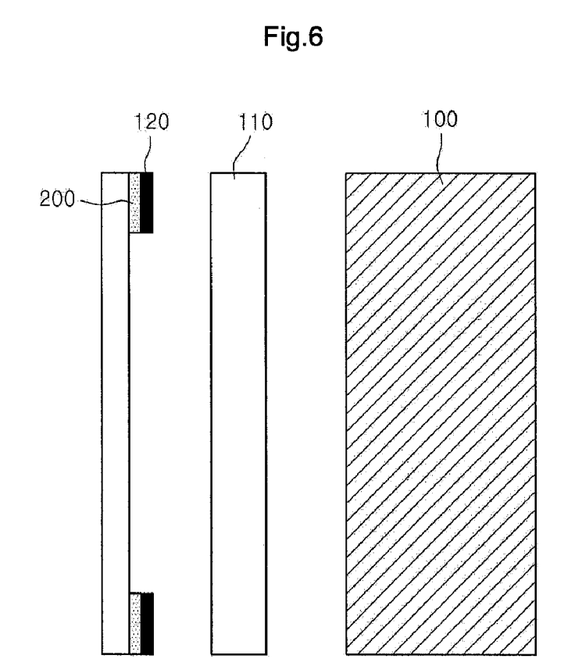
Figure 7:
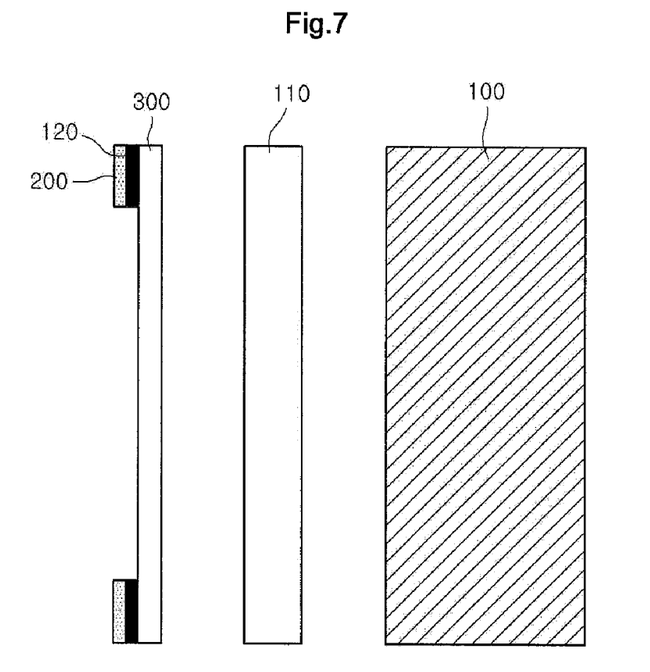
Figure 8:
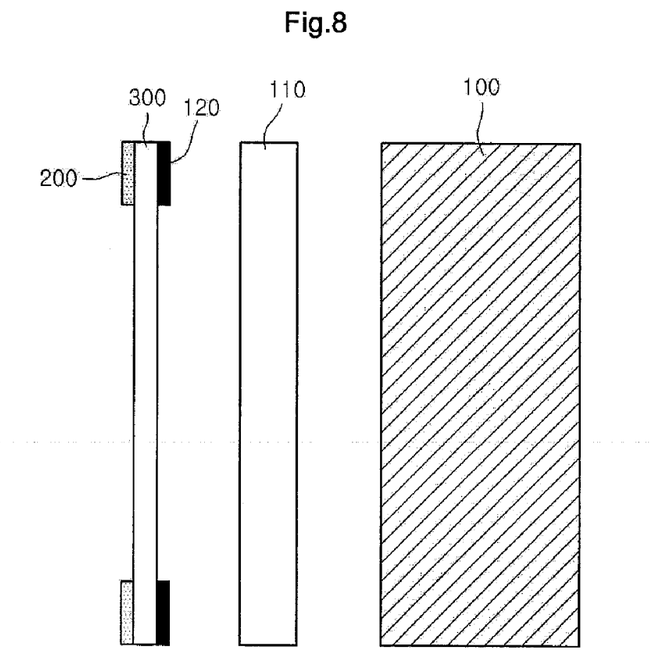

Moreover, as shown in FIGS. 6 to 8, the light shielding layer and reflective layer may be formed on transparent film 300, which is disposed in front of front panel 110. That is, as illustrated in FIG. 6, the reflective layer 200 may be formed at a first surface, which is more adjacent to display module 100 among the surfaces of transparent film 300, and the light shielding layer 120 may be stacked and formed on reflective layer 200. By forming an adhesive layer (not shown) between light shielding layer 120 and front panel 110, transparent film 300 may be adhered and fixed to the front panel.

Alternatively, as shown in FIG. 7, light shielding layer 120 may be formed at a second surface, which is farther away from display module 100 among the surfaces of transparent film 300, and reflective layer 200 may be stacked and formed on light shielding layer 120. By forming an adhesive layer (not shown) between transparent film 300 and front panel 110, the transparent film may be adhered and fixed to the front panel.

Referring to FIG. 8, light shielding layer 120 may be formed at the first surface of transparent film 300 and reflective layer 200 at the second surface of the transparent film, and an adhesive layer (not shown) may be formed between the light shielding layer and the front panel.

Figure 9:
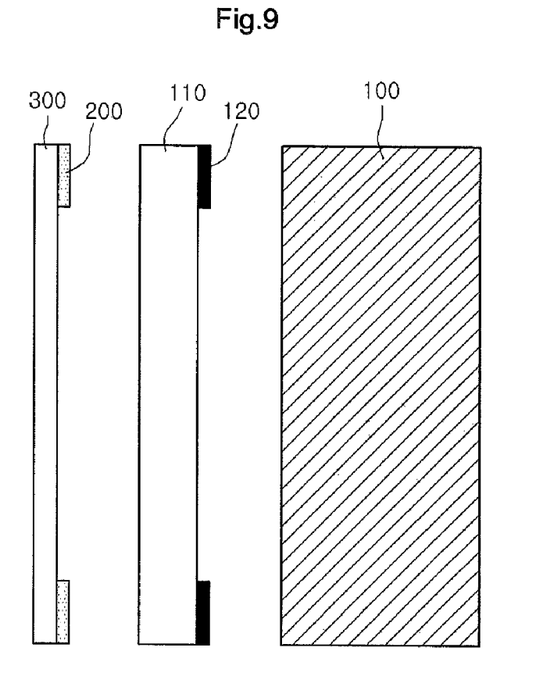

According to another arrangement, the light shielding layer 120 and reflective layer 200 may be formed at front panel 110 and transparent film 300, respectively, as shown in FIG. 9. That is, the light shielding layer may be formed at a first surface of the front panel and the reflective layer at the first surface of the transparent film.

Figure 10:
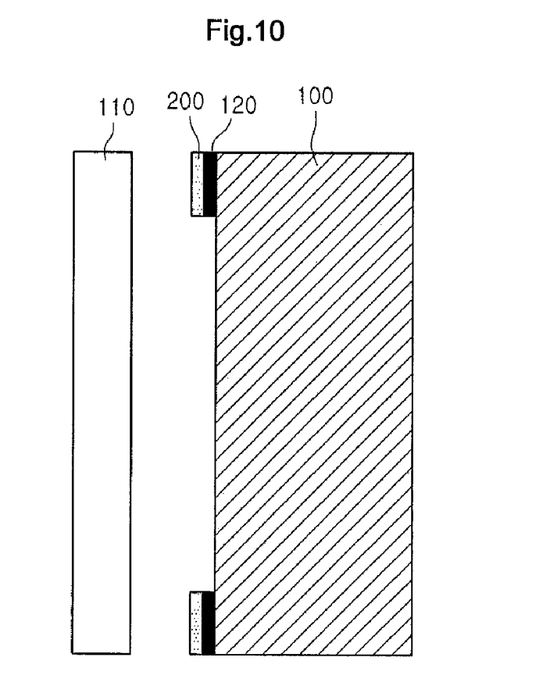

Referring to FIG. 10, at least one of light shielding layer 120 or reflective layer 200 may be formed on display module 100, for example, the upper substrate of the display panel. That is, light shielding layer 120 may be formed on display module 100 and reflective layer 200 may be stacked on the light shielding layer or may be formed at one surface of front panel 110 or one surface of transparent film 300.

Figure 11:
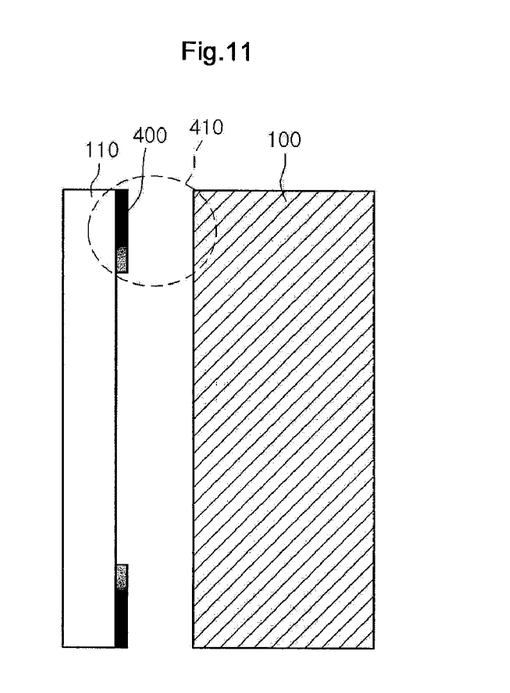
FIGS. 11 to 13 are diagrams showing cross-sectional views of a second embodiment of a display apparatus.
Figure 12:
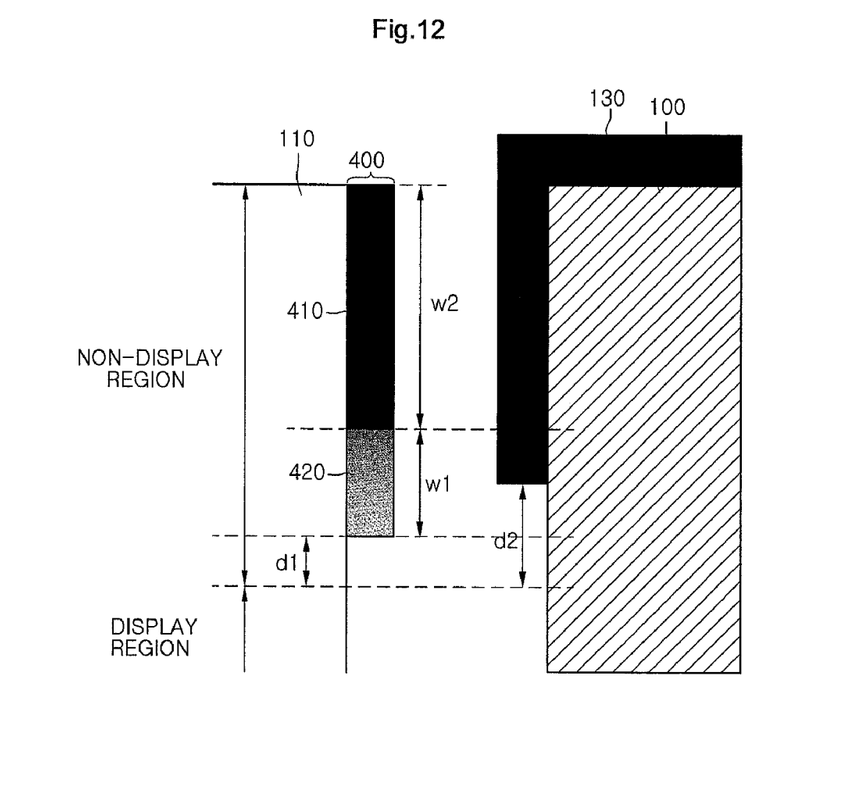
Figure 13:
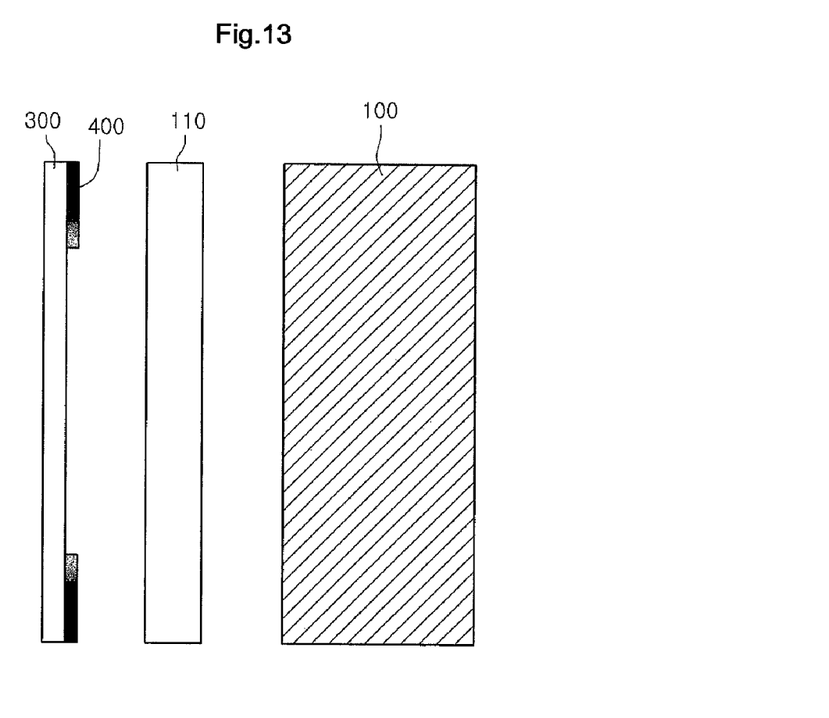

FIGS. 11 to 13 show a second embodiment of a display apparatus. In these figures, a gradation pattern may be formed at a non-display region. In the gradation pattern, for example, at least one of color, a reflection rate or a light transmittance may vary according to location.

Referring to FIG. 11, a light shielding layer 400 may be formed at the non-display region of front panel 110 and a pattern 420 may be formed adjacent to the light shielding layer. Pattern 420 may be provided closer to an edge of the transparent film to allow for less transmittance of light. That is, in pattern 420, light transmittance may decrease incrementally or at a predetermined rate. For example, in the pattern 420, color tone may become darker in a direction approaching an outermost portion of the non-display region.

FIG. 12 shows an exploded view of the dotted-line portion 410 of FIG. 11. Here, light shielding layer 400 and pattern 420 are formed on front panel 110 and pattern 420 may be formed adjacent to (e.g., in contact with) the light shielding layer. Also, pattern 420 is closer to the display region than the light shielding layer.

The light shielding layer 400 may be a region in which light transmittance is uniform and the pattern is a region in which light transmittance varies incrementally or otherwise in a predetermined manner. That is, light transmittance of the pattern 420 may decrease in a direction approaching light shielding layer 400. Accordingly, the light transmittance of the light shielding layer may be lower than an average transmittance of the light transmittance of pattern 420.

A portion of pattern 420 that is nearer to the display region may have a large light transmittance, e.g., a light transmittance equal to or higher than 85%. A portion of the pattern nearer to (e.g., at the boundary between pattern 420 and layer 400) may have a light transmittance which is very close to the light transmittance of the light shielding layer.

For example, light shielding layer 400 may have light transmittance close to 0%, and the boundary portion of pattern 420 most adjacent to the light shielding layer may have light transmittance lower than about 5%. Moreover, the width 'w1' of pattern 420 may be set to narrower than the width 'w2' of light shielding layer 400 in order for the non-display region to appear to wholly have a black color.

As described above, by incrementally varying the light transmittance of pattern 420, the boundary between the display and non-display regions in which the light shielding layer 400 is formed may not visually appear. Accordingly, the visual difference between the display and non-display regions can be decreased or rendered virtually imperceptible.

The light shielding layer 400 and pattern 420 may be formed by printing a black layer. For example, pattern 420 may be formed by varying the density of a black print point which is printed. That is, light shielding layer 400 may print a black layer at a uniform print density. In the pattern, the black layer may be printed to increase a print density in a direction approaching light shielding layer 400.

Moreover, the width 'w1' of pattern 420 may be wider than about 2.5 μm so that the boundary between the non-display and display regions, and more specifically between light shielding layer 400 and the display region, may not be visually perceptible or appear less so by decreasing the light transmittance of pattern 420 incrementally or otherwise at a predetermined rate.

Because the quality of a displayed image may be degraded when pattern 420 overlaps the display region, the width 'w1' of pattern 420 may be set within a range in which the pattern does not overlap the display region. Moreover, to prevent pattern 420 from overlapping the display region due to process error, a distance 'd1' between pattern 420 and the display region may be wider than one-half of a distance 'd2' between the display region and a top case 130.

The top case covers the outer region of display module 100 and covers the non-display region of the front surface of the display module, thereby protecting it. In this case, a portion of the top case which overlaps with light shielding layer 400 is screened by a second region 410 and thereby is not seen at the front of the display apparatus. But, another portion of the top case which overlaps pattern 420 may be seen at the front of the display apparatus.

To prevent the exterior quality of the display apparatus from being degraded because a portion of top case 130 is visible to a user, the top case may be colored in black. For example, only a portion of the top case which overlaps pattern 420 may be colored in black.

Although, in FIGS. 11 and 12, light shielding layer 400 and pattern 420 are formed at a first surface (the one more adjacent to display module 100) among the surfaces of the front panel 110, other arrangements are possible. For example, light shielding layer 400 and pattern 420 may be formed at a second surface (the one farther away from display module 100) among the surfaces of front panel 110.

Moreover, as shown in FIG. 13, light shielding layer 400 and pattern 420 may be formed at the one surface of transparent film 300 that is disposed in front of the front panel 110. In this case, an adhesive layer is formed between light shielding layer 400 and the front panel, and thus transparent film 300 may be adhered and thereby fixed to the front panel.

According to above-described embodiments, the light transmittance of pattern 420 may vary based on its location. By incrementally varying the brightness of the color of pattern 420 throughout its width, the boundary between the display and non-display regions may be rendered virtually imperceptible or at least substantially diminished. For example, the color of pattern 420 may have a highest level of brightness at a location most adjacent to the display region, and brightness may decrease as pattern 420 progresses in a direction toward the outermost portion of the non-display region.

Figure 14:
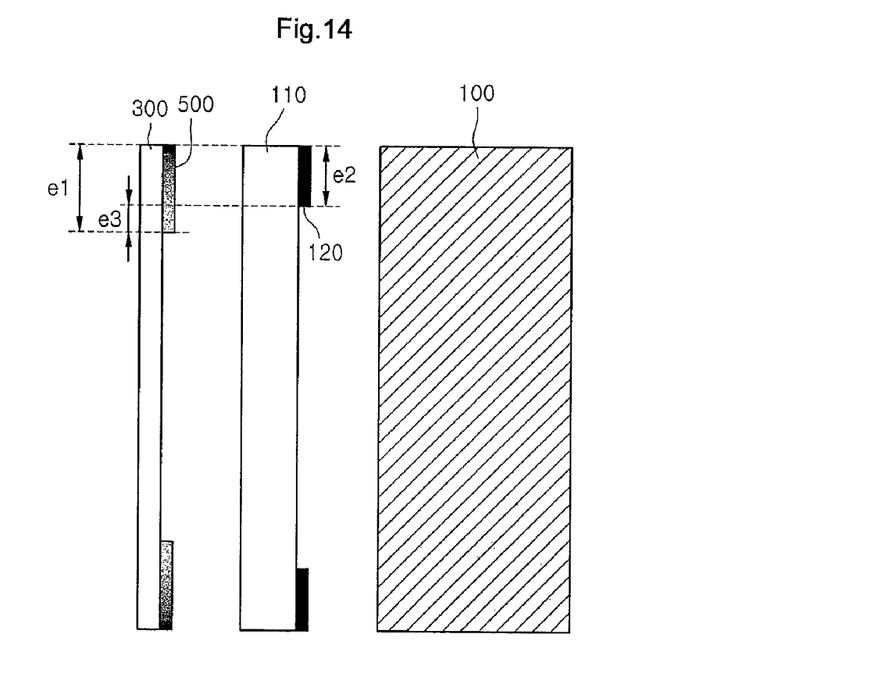
FIGS. 14 to 16 are diagrams showing cross-sectional views of a third embodiment of a display apparatus.
Figure 15:
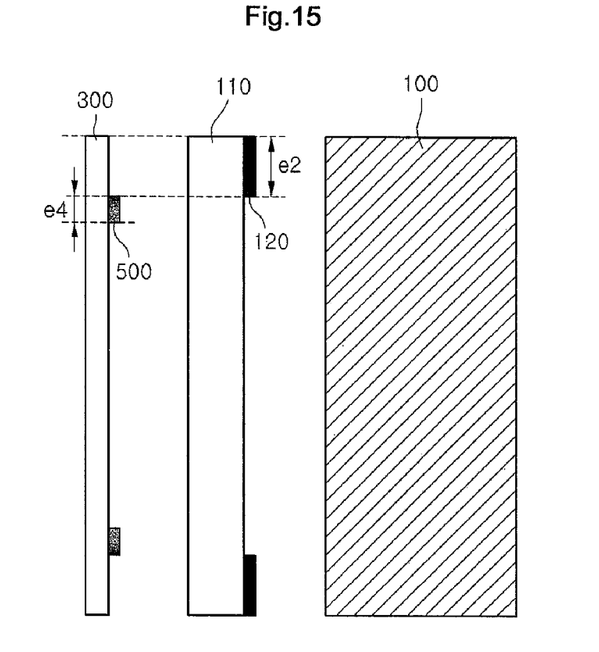
Figure 16:
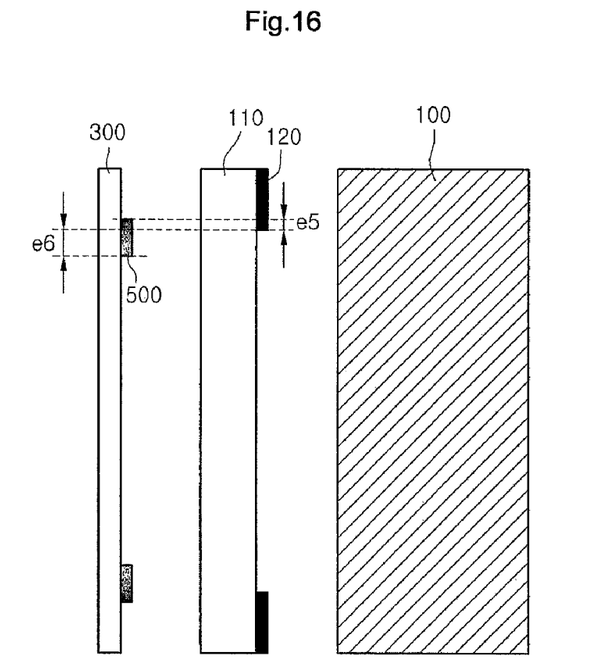

FIGS. 14 to 16 show a third embodiment of a display apparatus, where a light shielding layer and gradation pattern are formed on different layers. Referring to FIG. 14, a pattern 500 may be formed on a surface of transparent film 300 and light shielding layer 120 may be formed on a surface of front panel 110.

The light transmittance of pattern 500 may be made to vary. For example, the light transmittance of pattern 500 may be highest at a portion which is most adjacent to the display region, and the light transmittance of the pattern may decrease as it progresses in a direction toward the outermost portion of the transparent film 300. Light shielding layer 120 may have a uniform light transmittance.

According to one arrangement, a portion of pattern 500 most adjacent to the display region may have a high transmittance of light, e.g., a light transmittance higher than about 85%. And, the light transmittance of pattern 500 may decrease in a direction towards an outermost portion of the non-display region, until the pattern has a light transmittance very close to the light transmittance of light shielding layer 120. For example, the light shielding layer 120 may have a light transmittance close to 0% and the portion of pattern 500 disposed at the outermost portion of the non-display region may have light transmittance lower than about 5%.

As shown in FIG. 14, the width 'e1' of pattern 500 may be wider than the width 'e2' of light shielding layer 120. Therefore, a portion of pattern 500 may be provided to be more adjacent to the display region while not overlapping the light shielding layer 120.

As described above, by disposing pattern 500 (in which light transmittance decreases toward an outer edge thereof) in front of light shielding layer 120, the boundary between the display and non-display regions and more specifically between the display region and the light shielding layer 120 may not be visually perceptible or may be made to be much less visually perceptible.

That is, because the light transmittance of a portion of the pattern 500 which does not overlap light shielding layer 120 has a maximum value at a portion most adjacent to the display region and as the pattern progresses in a direction farther away from the display region light transmittance incrementally decreases, the visual difference between the display and non-display regions decrease when seen from the front of the display apparatus.

To prevent the boundary between light shielding layer 120 and display region from visually appearing, the width 'e3' of a portion of the pattern 500 which does not overlap light shielding layer 120 may be set to wider than about 2.5 μm within a range in which the pattern 500 does not overlap the display region. Moreover, the width 'e1-e3' of a portion of pattern 500 which overlaps the light shielding layer 120 may be wider than the width 'e3' of a portion of pattern 500 which does not overlap light shielding layer 120.

Referring to FIG. 15, in another arrangement pattern 500 formed at one surface of transparent film 300 does not overlap light shielding layer 120 according to the position of the inner end of light shielding layer 120. In this case, a portion of pattern 500 most adjacent to the display region may have light transmittance in which most light transmits, for example, light transmittance higher than about 85%, and the outermost portion of pattern 500 may have a light transmittance very close to the light transmittance of light shielding layer. For example, light shielding layer 120 may have a light transmittance close to 0% and the outermost portion of pattern 500 may have a light transmittance lower than about 5%.

The width 'e4' of pattern 500 may be narrower than width 'e2' of light shielding layer 120. To prevent the boundary between the light shielding layer and display region from visually appearing, width 'e4' may be set to be wider than about 2.5 μm within a range in which pattern 500 does not overlap the display region.

Referring to FIG. 16, according to another arrangement, a portion of pattern 500 overlaps light shielding layer 120 and another portion does not overlap the light shielding layer. Width 'e5' of a portion of the pattern which overlaps light shielding layer 120 may be narrower than width 'e6' of the other portion which does not overlap the layer.

To prevent the boundary between light shielding layer and the display region from visually appearing, width 'e6' which does not overlap the light shielding layer may be set to be wider than about 2.5 μm within a range in which the pattern does not overlap the display region. As illustrated in FIG. 16, by overlapping a portion of pattern 500 having the narrow width 'e5' with the light shielding layer, the boundary between the display region and the non-display region can be made more visually imperceptible.

Pattern 500 may be formed by varying (increasing) the density of black print as pattern 500 progresses in a direction towards an outermost edge of the non-display region. Moreover, the light shielding layer 120 may be formed by printing a black layer at a uniform print density. In FIGS. 14 to 16, an adhesive layer (not shown) may be formed between pattern 500 and front panel 110, and thus the transparent film 300 may be adhered and thereby fixed to the front panel 110.

In FIGS. 14 to 16, a distance between pattern 500 and the display region may be wider than one-half of the distance between the display region and a top case (not shown) for preventing pattern 500 from overlapping the display region due to a process error, as described above with reference to FIG. 12. Because a portion of the top case (not shown) which overlaps pattern 500 may be seen at the front of the display apparatus, the top case may be colored in black to prevent a visual difference from occurring as a result of the top case.

Figure 17:
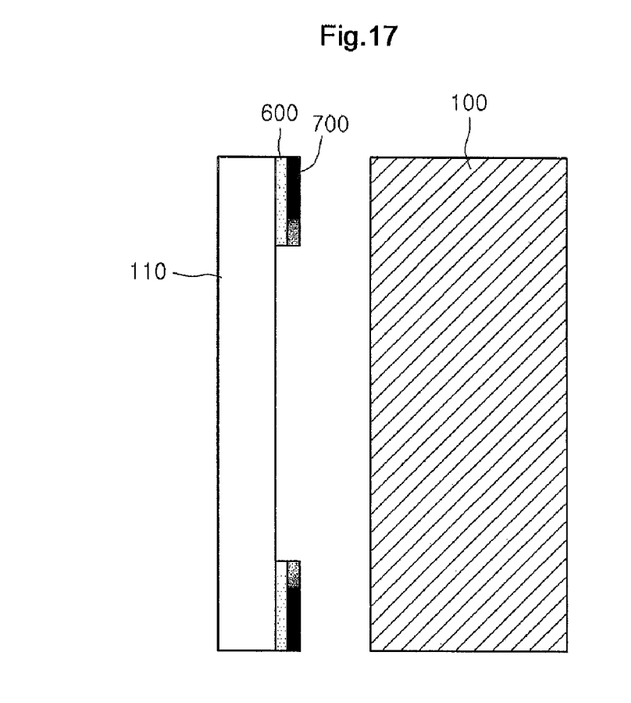
FIGS. 17 to 20 are diagrams showing cross-sectional views of a fourth embodiment of a display apparatus.

FIGS. 17 to 20 show a fourth embodiment of a display apparatus. Referring to FIG. 17, a reflective layer 600, a light shielding layer 700 and gradation pattern 710 may be formed at the one surface of the front panel 110. The configuration of the reflection layer 600 may be the same as that of the reflection layer 200 which has been described with reference to FIGS. 2 to 10, and its description therefore will be omitted. As described above, the reflection layer 600 may be metal thin-film layer which is light-reflexible and light-transmittable.

Moreover, the configuration of the light shielding layer 700 and pattern 710 may be the same as that of light shielding layer 400 and pattern 420 which has been described with reference to FIGS. 11 to 13, and its description therefore will be omitted.

As shown in FIG. 17, by overlapping reflection layer 600 with light shielding layer 700 and pattern 710, a display region and a non-display region may have the same reflection sensitivity and therefore the boundary between the display region and the non-display region may not be visually perceptible. Accordingly, the visual difference between the display and non-display regions decreases and thus the front surface of the display apparatus may be seen by a user as one layer having the same color and reflection sensitivity.

In FIG. 17, reflection layer 600, light shielding layer 700 and pattern 710 are formed at the first surface (which is more adjacent to the display module 100) among the surfaces of the front panel 110. However, other arrangements are possible.

Figure 18:
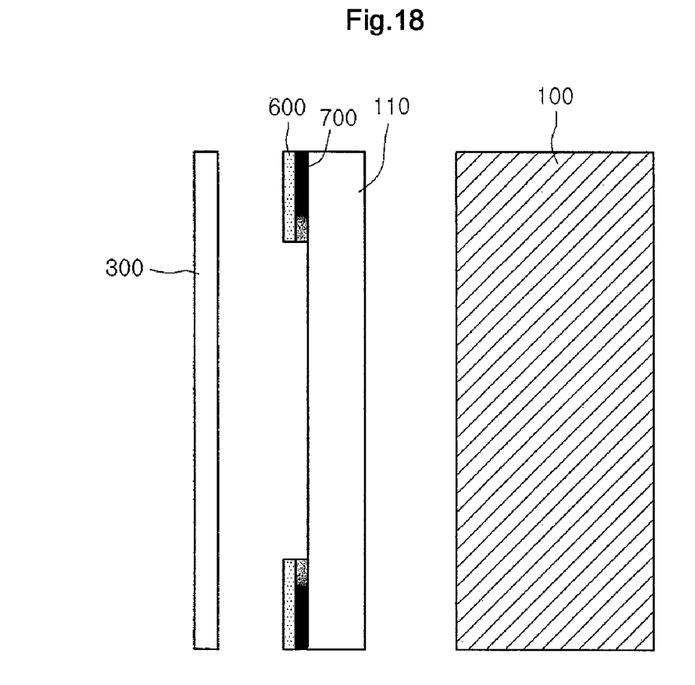

As shown in FIG. 18, reflection layer 600, light shielding layer 700 and pattern 710 may be formed at a second surface, which is farther away from display module 100, among the surfaces of the front panel 110. Moreover, reflection layer 600 and light shielding layer 700 may be formed at respective surfaces of the front panel. Furthermore, transparent film 300 may be disposed in front of the front panel 110.

Figure 19:
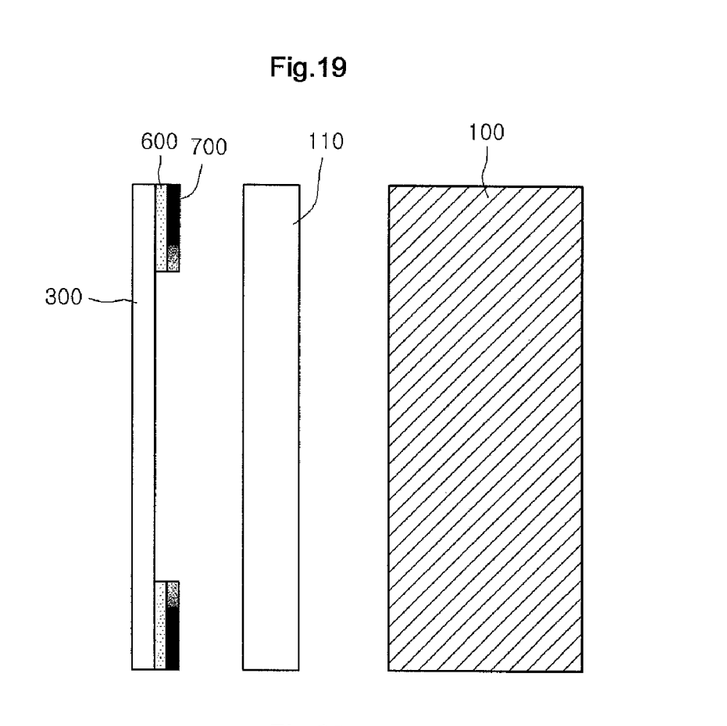

As shown in FIG. 19, reflection layer 600, light shielding layer 700 and pattern 710 may be formed at transparent film 300 which is disposed in front of the front panel 300. That is, reflection layer 600, light shielding layer 700 and pattern 710 may be formed at a first surface, which is nearer to display module 100, among the surfaces of the transparent film 300.

Figure 20:
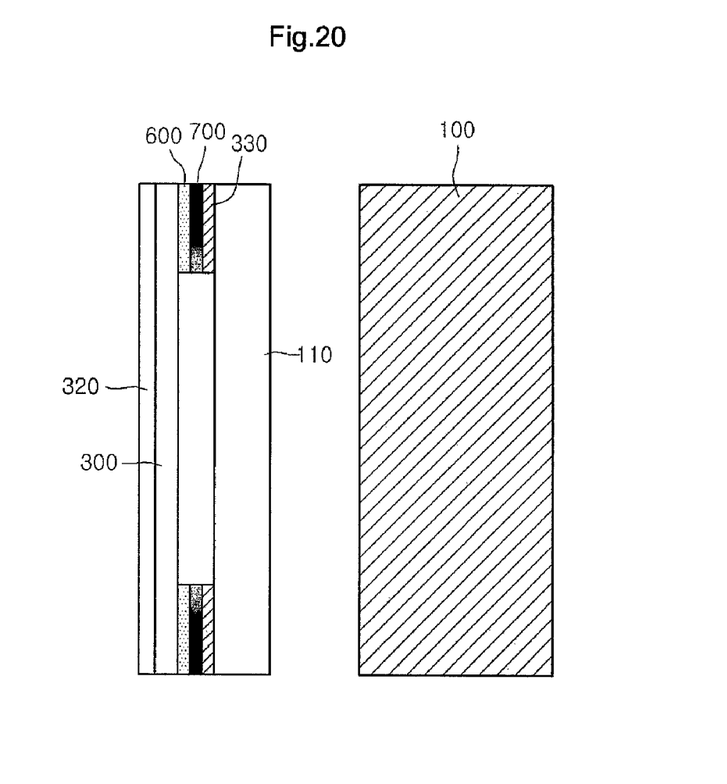

As illustrated in FIG. 20, by forming an adhesive layer 330 between light shielding layer 700 and front panel 110, transparent film 300 may be adhered and thereby fixed to the front panel. Furthermore, a hard coating layer 320 may be formed at the one surface of the transparent film 300.

Figure 21:
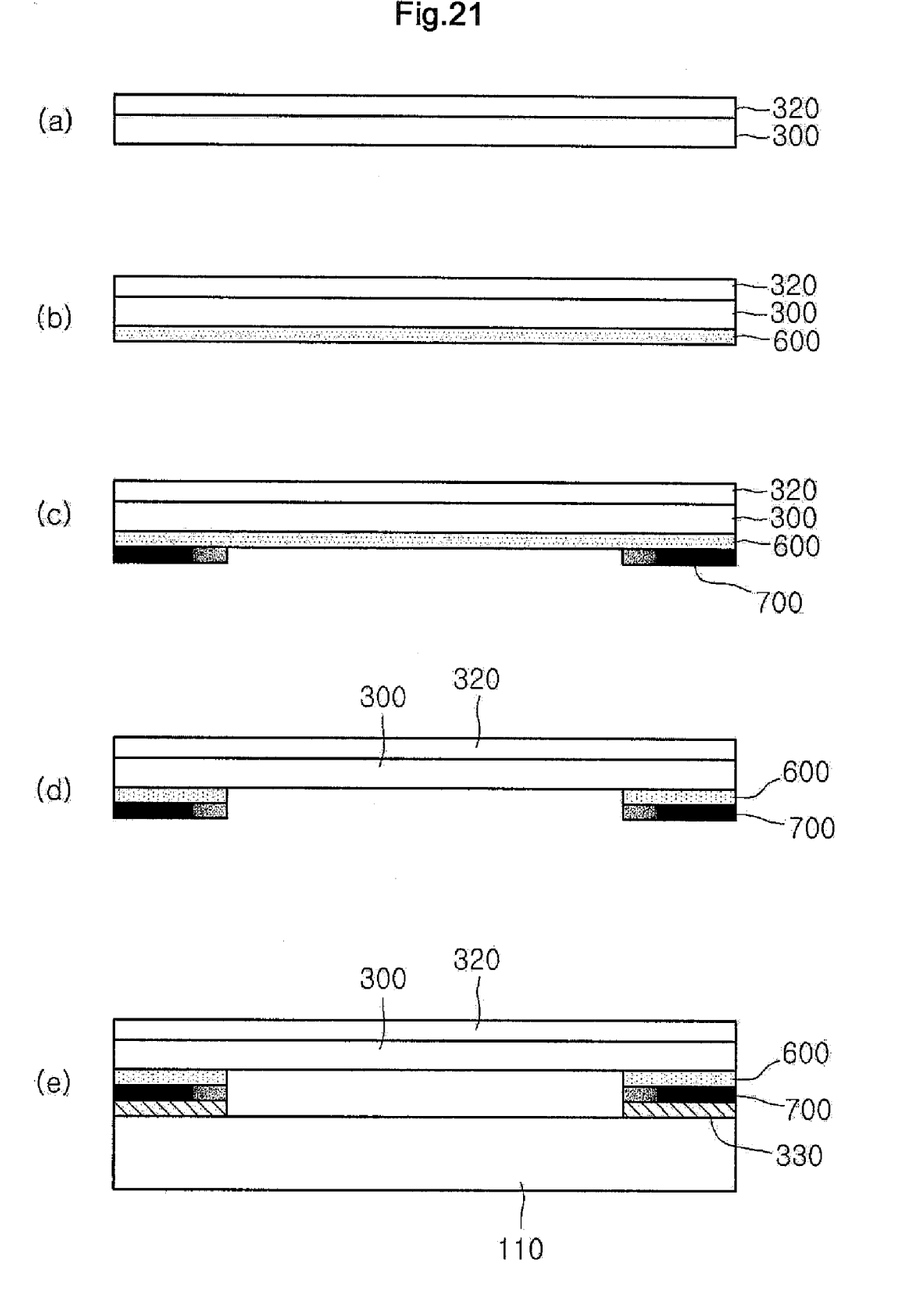

FIGS. 21(*a*)-(*e*) show a series of cross-sectional views that corresponds to various steps of an embodiment of a method for manufacturing a display apparatus. Such a method may be used to manufacture at least the display apparatus in FIG. 20.

Referring to FIG. 21(a), hard coating layer 320 is formed on transparent film 300 which may be formed of PET. As shown in FIG. 21(b), reflection layer 600 is formed by depositing a metal such as Ni or Al at a lower side surface of film 300.

As shown in FIG. 21(c), by printing a black layer at the non-display region on reflection layer 600, light shielding layer 700 and pattern 710 are formed. For example, light shielding layer 700 and pattern 710 are formed on reflection layer 600 at once. Unlike this, light shielding layer 700 and pattern 710 are formed on reflection layer 600 separately.

As shown in FIG. 21(d), a portion of reflection layer 600 in which the light shielding layer 700 and pattern 710 are not formed is removed through an etching process, wherein reflection layer 600 is formed at transparent film 300. As shown in FIG. 21(e), light shielding layer 700 and front panel 110 are adhered by the adhesive layer 330.

Figure 22:
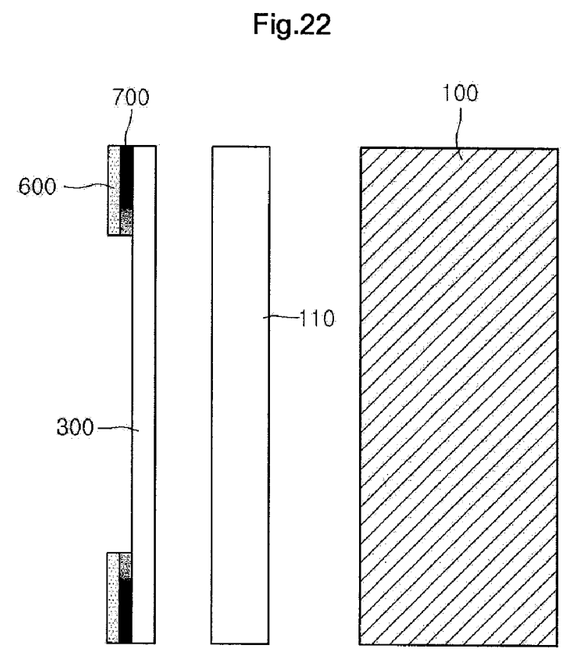
FIGS. 22 and 23 are diagrams showing additional cross-sectional views of one or more embodiments of a display apparatus.

Referring to FIG. 22, reflection layer 600, light shielding layer 700 and pattern 710 may be formed at a second surface, which is farther away from display module 100, among the surfaces of transparent film 300.

Figure 23:
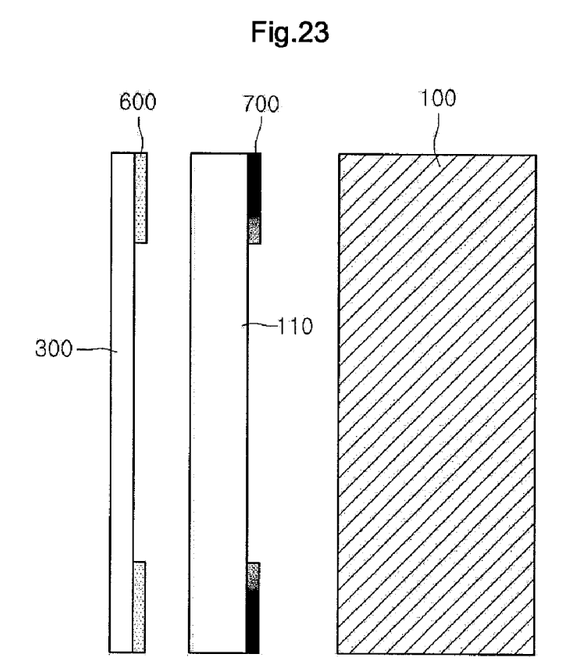

As illustrated in FIG. 23, alternatively, reflection layer 600 may be formed at transparent film 300, and light shielding layer 700 and pattern 710 may be formed at the front panel 110, respectively.

By forming the reflection layer at the non-display region of the display apparatus, a visual difference (which is sensed by a user) between the display region and the non-display region can be decreased when the display apparatus is powered off. Accordingly, the exterior design of the display apparatus can improve.

One more embodiments described herein provide a display apparatus which decreases the visual difference between a non-display region and a display region on which images are displayed, thereby improving the exterior of the display apparatus.

In one embodiment, a display apparatus includes: a display module; a front panel provided in front of the display module; a light shielding layer provided over the front panel near a periphery of the front panel; and a reflective layer formed to overlap with the light shielding layer, wherein the light shielding layer is disposed between the reflective layer and the display module.

In another embodiment, a display apparatus includes: a display module; a front panel provided in front of the display module; a light shielding layer provided over the front panel near a periphery of the front panel; and a reflective layer formed to overlap with the light shielding layer, wherein the reflective layer has a greater light transmittance than the light shielding layer.

In further another embodiment, a display apparatus includes: a display module; a front panel provided in front of the display module; a light shielding layer provided over the front panel near a periphery of the front panel; and a metal thin-film layer formed to overlap with the light shielding layer, wherein the light shielding layer is disposed between the metal thin-film layer and the display module.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus, comprising:
   a display module;
   a display region in which an image is displayed,
   a non-display region in which an image is not displayed,
   a front panel provided in front of the display module;
   a transparent film provided in front of the display module,
   a light shielding layer provided over the front panel; and
   a variable light transmittance pattern provided over the front panel, wherein;
   the light shielding layer and variable light transmittance pattern overlap the non-display display region and do not overlap the display region,
   the light shielding layer is coupled to a first surface of one of the front panel or transparent film,
   the variable light transmittance pattern is coupled to a second surface of the other one of the front panel or transparent film, and
   the light shielding layer has a transmittance pattern different from the variable light transmittance pattern, and
   wherein the variable light transmittance pattern includes a first location and a second location, the variable light transmittance pattern causing a light property to change at a predetermined rate from the first location to the second location, the second location being closer to the display region than the first location.

2. The display apparatus of claim 1, wherein the light shielding layer is a black layer which is printed near a periphery of the front panel.

3. The display apparatus of claim 1, wherein the light shielding layer is coupled to a first surface of the front panel.

4. The display apparatus according to claim 3, wherein the variable light transmittance pattern is coupled to the second surface of the transparent film.

5. The display apparatus according to claim 1, wherein the light shielding layer has a substantially uniform transmittance.

6. The display apparatus according to claim 5, wherein:
   a difference between light transmittance at the first location of the variable light transmittance pattern and the uniform transmittance of the light shielding layer lies in a range between substantially 0% and 5%, and
   the second location of the variable light transmittance patterns has a greater transmittance than the substantially uniform transmittance of the light shielding layer.

7. The display apparatus according to claim 6, wherein the first location of the variable light transmittance pattern begins substantially at an edge of the light shielding layer.

8. The display apparatus according to claim 5, wherein the uniform transmittance of the light shielding layer is substantially 0%.

9. The display apparatus according to claim 5, wherein the variable light transmittance pattern overlaps the light shielding layer.

10. The display apparatus according to claim 9, wherein:
    the light shielding layer has a first width,
    the variable light transmittance pattern has a second width, and
    the light shielding layer and the variable light transmittance pattern overlap by a third width different from at least one of the first width or the second width.

11. The display apparatus of claim 10, wherein the first width is substantially equal to the third width.

12. The display apparatus according to claim 11, wherein the second width is greater than the first and third widths.

13. The display apparatus according to claim 10, wherein the third width is less than the first and second widths.

14. The display apparatus according to claim 13, wherein the first width is greater than the second width.

15. The display apparatus according to claim 13, wherein the first width is greater than the second width and wherein the second width is greater than the third width.

16. The display apparatus according to claim 5, wherein the variable light transmittance pattern does not overlap the light shielding layer.

17. The display apparatus according to claim 16, wherein the light shielding layer has a first width, and the variable light transmittance pattern has a second width different from the first width.

18. The display apparatus according to claim 17, wherein the first width is greater than the second width.

19. The display apparatus according to claim 1, wherein the light shielding layer is in contact with a third surface and wherein the third surface is a surface of one of the front panel or transparent film different from the first and second surfaces.

20. The display apparatus according to claim 19, wherein the variable light transmittance pattern is in contact with a fourth surface and wherein the fourth surface is a surface of one of the front panel or transparent film different from the first, second, and third surfaces.

* * * * *